United States Patent [19]
Tobe et al.

[11] 3,904,663
[45] Sept. 9, 1975

[54] COMPOSITIONS CONTAINING PLATINUM

[75] Inventors: Martin Leslie Tobe, Northwood; Abdul Rauf Khokhar, London; Peter David Michael Braddock, Wigan, all of England

[73] Assignee: Rustenburg Platinum Mines Limited, Johannesburg, South Africa

[22] Filed: Apr. 9, 1973

[21] Appl. No.: 349,187

[30] Foreign Application Priority Data
Apr. 10, 1972 United Kingdom............... 16451/72
May 8, 1972 United Kingdom............... 21390/72

[52] U.S. Cl............................. 260/429 R; 424/287
[51] Int. Cl.².................... C07F 15/00; C07C 87/58
[58] Field of Search............................... 260/429 R

[56] References Cited
OTHER PUBLICATIONS
Gmelin Handbuch der Anorganishen Chemie, Vol. 68D, (1953), Verlag Chemie Weinheim, p. 266–278.
Ostromisslensy et al., Bericht, 43 (1910), p. 2768–2771.
Rosenberg et al., Nature, 222(1969), p. 385–386.

*Primary Examiner*—Arthur P. Demers
*Attorney, Agent, or Firm*—Cushman, Darby & Cushman

[57] ABSTRACT

The invention describes a composition which is active against ADJ/PC6 tumour in mice comprising a coordination complex of platinum (II) having the structure

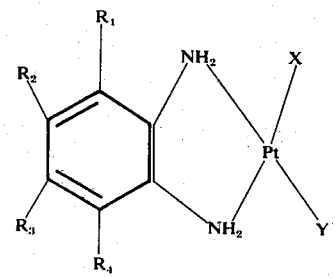

in which $R_1$ to $R_4$ are the same or different and are selected from the group consisting of hydrogen, alkyl, aryl, aralkyl, alkaryl, halogen, pseudohalogen, nitro, amido, amino, hydroxy, formyl, carboxylic acid, carboxylic acid salt, sulphonic acid, sulphonic acid salt and lkyl, aryl, aralkyl and alkaryl groups having as a substituent a member of the said group defined above and in which X and Y are halogenoid groups which may be the same or different.

6 Claims, No Drawings

COMPOSITIONS CONTAINING PLATINUM

This invention relates to compositions which are active against ADJ/PC6 tumour in mice and to methods of preparation and to methods of use of such compositions.

According to the present invention the composition comprises a coordination complex of platinum (II) with a phenylene diamine which has the structure

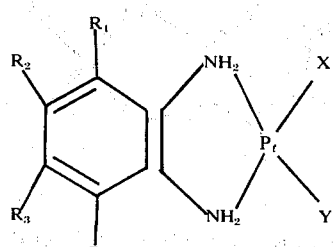

in which the six membered ring is an aromatic nucleus, $R_1$, $R_2$, $R_3$ and $R_4$ are preferably hydrogen or lower alkyl groups (methyl or ethyl) but may be selected from the group consisting of hydrogen, alkyl, aryl, aralkyl, alkaryl, halogen, pseudohalogen, nitro, amido, amino, hydroxy, formyl carboxylic acid, carboxylic acid salt, sulphonic acid, sulphonic acid salt and alkyl aryl, aralkyl and alkaryl groups substituted with a member of the said groups and X and Y are halogenoid groups which may be the same or different but are preferably both chloride or other halide or pseudohalide such as cyanide, cyanate, thiocyanate and azide, ozide etc. By the term "halogenoid" we mean selected from the group consisting of halogen and pseudohalogen compounds; cis-dichloro diamine platinum (II) is a known anti-neoplastic compound having a therapeutic index of 8.1. Dichloro (o - phenylene diamine) platinum (II) and dichloro (4,5 - dimethyl - o phenylene diamine) platinum (II) have corresponding therapeutic indices of 20.4 and greater than 56.7 respectively. The biological data for these compounds and chemically similar but structurally different compounds when tested against ADJ/PC6 plasma cell tumour for comparative purposes are given below:

These results represent the activity for the platinum compounds on the ADJ/PC6 plasma cell tumour.

The tests were carried out on Balb/C white mice using 3 test mice for each dose level and a minimum of 6 untreated control mice.

SUMMARY OF ACTIVE PLATINUM COMPOUNDS ON THE ADJ/PC6 PLASMA CELL TUMOUR

| NAME | FORMULA | VEHICLE | ROUTE | DOSE (single) mg/Kg | $ED_{90}$ mg/Kg | $LD_{50}$ mg/Kg | TI | MEAN TUMOUR WT. AS % OF CONTROL | % HIB | REMARK |
|---|---|---|---|---|---|---|---|---|---|---|
| cis-Dichloro-diammine Platinum (II) | [Pt(NH₃)₂Cl₂] | Oil | i.p. | 0.15625 | 1.60 | 13 | 8.1 | 116.7 | −16.7 | For comparison |
| | | | | 0.3125 | | | | 50 | 50 | |
| | | | | 0.625 | | | | 69 | 31.0 | |
| | | | | 1.25 | | | | 16.4 | 83.4 | |
| | | | | 2.5 | | | | 2.4 | 97.6 | |
| | | | | 5 | | | | 0.7 | 99.3 | |
| | | | | 10 | | | | 0 | 100 | 1D/3 |
| | | | | 20 | | | | 3D/3 | | |
| | | | | 40 | | | | 3D/3 | | |
| Dichloro[(DL)-cyclohexane (trans)-1,2-diamine] platinum (II) | | Oil | i.p | 0.3125 | 2.05 | 14.15 | 6.9 | 75.1 | 24.9 | |
| | | | | 0.625 | | | | 83.1 | 16.9 | |
| | | | | 1.25 | | | | 34.9 | 65.1 | For comparison |
| | | | | 2.5 | | | | 0.4 | 99.6 | |
| | | | | 5 | | | | 0.8 | 99.2 | |
| | | | | 10 | | | | 0.4 | 99.6 | |
| | | | | 20 | | | | 3D/3 | | |
| | | | | 40 | | | | 3D/3 | | |
| cis-dichloro-bis-pyrrolidino-platinum (II) ABC 117 | | Oil | i.p | 3.125 | 10.8 | 141.5 | 13.1 | 68.6 | 31.4 | |
| | | | | 6.25 | | | | 26.0 | 74.0 | |
| | | | | 12.5 | | | | 5.9 | 94.1 | For comparison |
| | | | | 25 | | | | 2.9 | 97.1 | |
| | | | | 50 | | | | 1.0 | 99.0 | |
| | | | | 100 | | | | 1.5 | 98.5 | |
| | | | | 200 | | | | 3D/3 | | |
| Dichloro-(4,5-dimethyl-o-phenylenediamine) platinum (II) | | oil | i.p. | 12 | 12 | 680 | G2S56.7 | 1.9 | 98.1 | |
| | | | | 60 | | | | 1.2 | 98.8 | |
| | | | | 300 | | | 2.5 | 97.5 | | |
| | | | | 1500 | | | | 3D/3 | | |
| Dichloro(o-phenylene-diamine) platinum (II) | | oil | i.p. | 0.625 | 2.35 | 48 | 20.4 | 92.3 | 7.7 | |
| | | | | 1.25 | | | | 53.8 | 46.2 | 1D/3 |
| | | | | 2.5 | | | | 6.2 | 93.8 | |
| | | | | 5 | | | | 1.5 | 98.5 | |
| | | | | 10 | | | | 1.5 | 98.5 | |
| | | | | 20 | | | | 1.1 | 98.9 | 1D/3 |
| | | | | 40 | | | | 0.55 | 99.45 | 1D/3 |
| | | | | 80 | | | | 3D/3 | | |

These results represent the activity for the platinum compounds on the ADJ/PC6 plasma cell tumor.

An ADJ/PC6 plasma cell tumour taken from a sacrificed mouse is dissected free of superfluous tissue and cut under sterile conditions into approximately 10 milligram size pieces. The tissue pieces were then implanted by trocar in the left acillary region subcutaneously, in new mice. The mice were, on the average, approximately seven weeks old and weighed 18–20 grams. Taking day 0 as the day of treatment (24 days after tumour implantation), the animals were sacrificed on day 10. The tumours were excised and weighed and the ratio of the weights of the tumours in the treated animals to the control set of animals was obtained.

In the test animals the compounds were injected on day 0 in oil, intraperitoneally. The volume of the injection is 1 ml per 100g. body weight.

ED90 is the minimum dose to cause a 90% regression in the size of the tumour. $LD_{50}$ is the dose level causing 50% deaths of the animals. The therapeutic index is $LD_{50}/ED_{90}$ and is a measure of the selectivity of the compound in question in treating the tumour. 1D/3 means one death in three animals; 3D/3 means three deaths in 3 animals etc.

These results show that compounds according to the invention compare very favourably in anti-tumour activity in mice with chemically similar but structurally different compounds. It is noted that the 4,5 dimethyl o-phenylene diamine derivative exhibits a considerably improved therapeutic index and low toxicity than the unsubstituted o-phenylene diamine complex.

Dichloro (o phenylenediamine) Pt (II) has also been tested on the Walker tumour. It has a therapeutic index for this tumour of 3 compared with 2 for cis dichlorodiamine Pt (II). The protocol used for testing against the Walker tumour is the same as that for the PC6 plasma cell tumour described above, except that Chester Beatty Wistar rats are used and treatment begins one day after tumour transplantation.

PREPARATION OF PLATINUM COMPLEXES

Dichloro (o-phenylenediamine)platinum (II)

o-Phenylenediamine dihydrochloride (0.436g) was added to a filtered solution of $K_2PtCl_4$ (1g) in 1N HCl (30ml) contained in a blackened flask to exclude light. The solution was kept at 50° for 1 day. The brown yellow needles which had formed were filtered off, washed with water, acetone and ether and dried in vacuo (yield 80%) (C, 19.4; H, 2.1; N, 7.5; Cl, 19.1% $C_6H_8Cl_2N_2Pt$ requires C, 19.3; H, 2.2; N,7.5; Cl 19.0 %)

The dichloro (4,5 dimethyl O-phenylenediamine) platinum (II) complex may be prepared in an analogous manner.

What we claim is:

1. A co-ordination complex of platinum (II) having the structure:

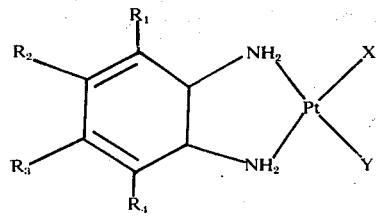

in which $R_1$ and $R_4$ are hydrogen, $R_2$ and $R_3$ are either both hydrogen or both lower alkyl and X and Y are halogen.

2. A co-ordination complex according to claim 1 wherein $R_1$–$R_4$ are hydrogen and X and Y are chlorine.

3. A co-ordination complex according to claim 1 wherein $R_2$ and $R_3$ are methyl or ethyl and X and Y are chlorine.

4. A complex according to claim 3 wherein $R_2$ and $R_3$ are methyl.

5. A method of preparation of dichloro (o-phenylenediamine) platinum (II) which comprises adding to o-phenylenediamine dihydrochloride to a filtered solution of an alkali metal chlorplatinate in hydrochloric acid solution in a covered vessel so that light is excluded and maintaining the resulting mixture at an elevated temperature, in the region of 50°C, for at least 12 hours.

6. A method of preparation of dichloro (4,5 dimethyl o-phenylenediamine) platinum (II) which comprises adding 4,5 dimethyl o-phenylene diamine dihydrochloride to a filtered solution of an alkali metal chlorplatinate in hydrochloric acid solution in a covered vessel so that light is excluded and maintaining the resulting mixture at an elevated temperature in the region of 50°C, for at least 12 hours.

* * * * *